(12) United States Patent
Whytock et al.

(10) Patent No.: US 7,575,160 B2
(45) Date of Patent: Aug. 18, 2009

(54) SECURITY VALIDATION OF MACHINE COMPONENTS

(75) Inventors: Alexander W. Whytock, Blairgowrie (GB); Michael J. Neilan, Dundee (GB); James Henderson, Fife (GB)

(73) Assignee: NCR Corporation, Dayton, OH (US)

( * ) Notice: Subject to any disclaimer, the term of this patent is extended or adjusted under 35 U.S.C. 154(b) by 295 days.

(21) Appl. No.: 11/521,712

(22) Filed: Sep. 15, 2006

(65) Prior Publication Data

US 2008/0067232 A1    Mar. 20, 2008

(51) Int. Cl.
G06F 5/00 (2006.01)
(52) U.S. Cl. .................. 235/380; 235/375; 235/379
(58) Field of Classification Search ............... 235/375, 235/379, 380, 382, 382.5, 385, 487, 492
See application file for complete search history.

(56) References Cited

U.S. PATENT DOCUMENTS

| | | | | |
|---|---|---|---|---|
| 5,745,049 | A * | 4/1998 | Akiyama et al. | 340/870.17 |
| 5,949,335 | A * | 9/1999 | Maynard | 340/572.1 |
| 5,969,260 | A * | 10/1999 | Belk et al. | 73/773 |
| 6,249,227 | B1 * | 6/2001 | Brady et al. | 340/572.1 |
| 6,667,690 | B2 * | 12/2003 | Durej et al. | 340/572.1 |
| 6,806,813 | B1 * | 10/2004 | Cheng et al. | 340/825.49 |
| 6,840,445 | B2 * | 1/2005 | Gatz | 235/385 |
| 6,847,856 | B1 * | 1/2005 | Bohannon | 700/115 |
| 6,943,683 | B2 * | 9/2005 | Perret | 340/538 |
| 7,042,358 | B2 * | 5/2006 | Moore | 340/572.1 |
| 7,053,775 | B2 * | 5/2006 | Moore | 340/572.1 |
| 7,121,460 | B1 * | 10/2006 | Parsons et al. | 235/379 |
| 2004/0003243 | A1 * | 1/2004 | Fehr et al. | 713/168 |
| 2004/0003252 | A1 * | 1/2004 | Dabbish et al. | 713/175 |
| 2004/0149819 | A1 * | 8/2004 | Shepley et al. | 235/379 |
| 2005/0030194 | A1 * | 2/2005 | Cheng et al. | 340/825.49 |
| 2005/0035852 | A1 * | 2/2005 | Paulsen | 340/438 |
| 2005/0144183 | A1 * | 6/2005 | McQuown et al. | 707/100 |
| 2005/0171661 | A1 * | 8/2005 | Abdel-Malek et al. | 701/33 |
| 2005/0187838 | A1 * | 8/2005 | Squeglia et al. | 705/29 |
| 2005/0280511 | A1 * | 12/2005 | Yokoyama et al. | 340/10.5 |
| 2006/0033606 | A1 * | 2/2006 | Howarth et al. | 340/10.1 |
| 2006/0091207 | A1 * | 5/2006 | Chang | 235/385 |
| 2006/0103504 | A1 * | 5/2006 | Vassallo | 340/5.92 |
| 2006/0139149 | A1 * | 6/2006 | Faro et al. | 340/5.73 |
| 2006/0164246 | A1 * | 7/2006 | Ghosh | 340/572.1 |
| 2006/0229928 | A1 * | 10/2006 | Nix, Jr. | 705/9 |
| 2007/0001850 | A1 * | 1/2007 | Malone et al. | 340/572.1 |
| 2007/0073907 | A1 * | 3/2007 | Factor et al. | 710/8 |

FOREIGN PATENT DOCUMENTS

WO    WO 01/82035 A2    11/2001

* cited by examiner

*Primary Examiner*—Daniel A Hess
*Assistant Examiner*—Paultep Savusdiphol
(74) *Attorney, Agent, or Firm*—Gregory A. Welte

(57) ABSTRACT

A method of validating machine components in a self-service terminal is disclosed which comprises providing at least one machine component with a machine readable identifier and reading identity data from the machine readable identifier using a processing unit. The identity data is compared with identity data stored in the memory of the processing unit to determine if the identity of a component has changed. If the identity has changed, the processing unit compares the identity data with source data to determine if the component is from a trusted source. In one embodiment, the self service terminal is an ATM and the components are an encrypting Personal Identification Number (PIN) pad, a cash dispenser unit and a card reader.

7 Claims, 4 Drawing Sheets

SECURITY VALIDATION OF MACHINE COMPONENTS

TECHNICAL FIELD

The present invention relates to security validation for component parts of Self-Service Terminals (SST) and, in particular, but not exclusively to components for Automated teller Machines (ATMs).

BACKGROUND

SSTs comprise machines which dispense goods to or perform services for a user. A common example of an SST is an ATM. When these machines develop a fault or are due for a service after they have been installed at a site, an engineer or maintenance operator is usually sent to diagnose the problem and/or correct the fault. Where correction of the fault requires installing a replacement component, there is a risk that that replacement component may be of a lower standard than the component initially installed by the manufacturer of the SST.

Taking the example of an ATM, there is a particular concern that the replacement component is of a high standard as an ATM is used as an interface for financial transactions. Moreover, ATMs are often the target of thieves, who could deliberately install a replacement component with a malicious purpose, for example, to gain access to security information entered by a subsequent user of the ATM.

In one prior art method, the problem is addressed by requiring an engineer to certify that replacement components are in good working order immediately following their installation. The process proceeds substantially as follows:

When an engineer is called to a faulty SST, he or she uses a device within the ATM known as an Operator Panel. An Operator Panel is a processing unit arranged to provide a user interface to the engineer and to guide the engineer through servicing and diagnostic procedures. In order to run the procedures, the engineer must pass a security clearance test. This is normally achieved by requiring the engineer to use a USB security dongle known in this context as a Service Security Key.

Whilst servicing the SST, the engineer may be required to replace a faulty component. The SST is arranged such that certification that the component is fully functional is required before the SST returns to normal operation. The certification is executed by the engineer through the Operator Panel and using the Service Security Key. A problem with this method is that should the engineer not have his or her Security Service Key, or should the Key itself be faulty, then the SST will not return to normal operation. Further, while the method ensures that the replacement component is functional, it does not ensure that the replacement component comes from a trusted source.

SUMMARY

According to a first aspect of the invention, there is provided a method of validating machine components in a self-service terminal comprising: providing at least one machine component with identity information in the form of a machine readable identifier reading identity data from the machine readable identifier; comparing the identity data with stored identity data to determine if the identity of a component has changed; and if the identity has changed, comparing the identity data with source data to determine if the component is from a trusted source.

This provides a convenient method of checking the quality and integrity of components. It will be appreciated that self-service terminals often accept cash and some, for example Automated Teller Machines (ATMs), are used for financial transactions. This means that high standards must be maintained for the components of terminals. Where a component is from a trusted source, it can be assumed that the high standard will have been met. In addition, terminals are often targets by malicious persons and as such it is important to be able to verify that components are genuine and not capable of being used to defraud users of a terminal.

Preferably, the method is carried out on start-up of the terminal. This is convenient as a terminal will generally be shut down in order to replace a component thereof. Checking the source of any replaced components on start-up means that any components which are not from a trusted source will be detected before use can be made of the terminal.

In such embodiment, the method may comprise disabling the terminal if a component is not from a trusted source. This is advantageous as it prevents the terminal from being operational with untrustworthy components.

The method may further comprise replacing the stored identity data with the changed identity data if the identity has changed. This is advantageous as the source of a component will not be determined in future unless the component is replaced.

In a preferred embodiment, the method comprises verifying security data before the stored identity data is replaced with changed identity data. This is advantageous as it helps to ensure that any replacement of a component has been carried out by an authorized operator or engineer.

According to a second aspect of the invention, there is provided a Self-service terminal processing unit comprising a memory for storing identity data, a requesting means arranged to request identity data from components of the terminal and a comparing means arranged to compare identity data received by the requesting means with identity data stored in the memory to detect any changes in identity data.

In one embodiment, the memory of the processing unit comprises component source data and the comparing means is arranged to compare changed identity data with the source data to determine if the component derives from a trusted source.

Preferably, the processing unit further comprises a security means arranged to receive security data from a maintenance operator and use the security data to determine whether a maintenance operator is an authorized operator.

Preferably, the processing unit is arranged to allow a terminal with which it is associated to operate only if the or each component is from a trusted source.

According to a third aspect of the invention, there is provided a self-service terminal comprising a processing unit according to the second aspect of the invention and further comprising at least one of the following components: an encrypting PIN pad, a cash dispenser unit and a card reader, the terminal being arranged such that identity data associated with the or each component can be read by the processing unit.

In a preferred embodiment, the terminal comprises one of each of the components mentioned above and the processing unit is arranged to determine whether each of the components is from a trusted source and to allow the terminal to operate only if all the components are from a trusted source.

Preferably, the identity data associated with the or each component is provided on a chip.

In one embodiment, the self-service terminal is an Automated Teller Machine.

According to a fourth aspect of the invention, there is provided computer software arranged to perform the method of the first aspect of the invention.

According to a fifth aspect of the invention, there is provided computer software, which, which loaded onto a processing unit causes the processing unit to act as the processing unit of the second aspect of the invention.

The above and other objects, features, and advantages of the present invention will become apparent from the following description and the attached drawings.

DETAILED DESCRIPTION

Figure 1:
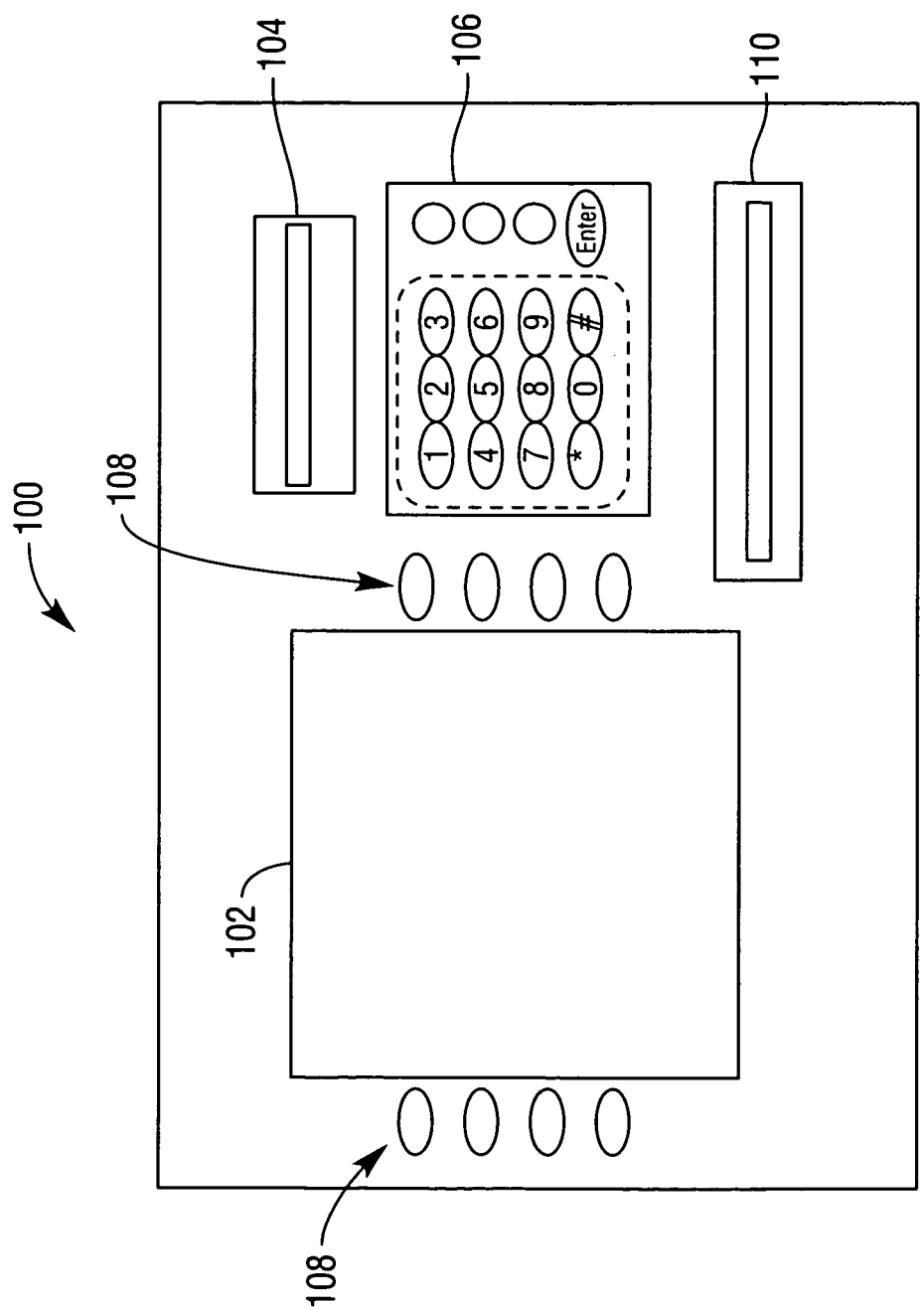
FIG. 1 shows the fascia of a Self-service terminal.
Figure 2:
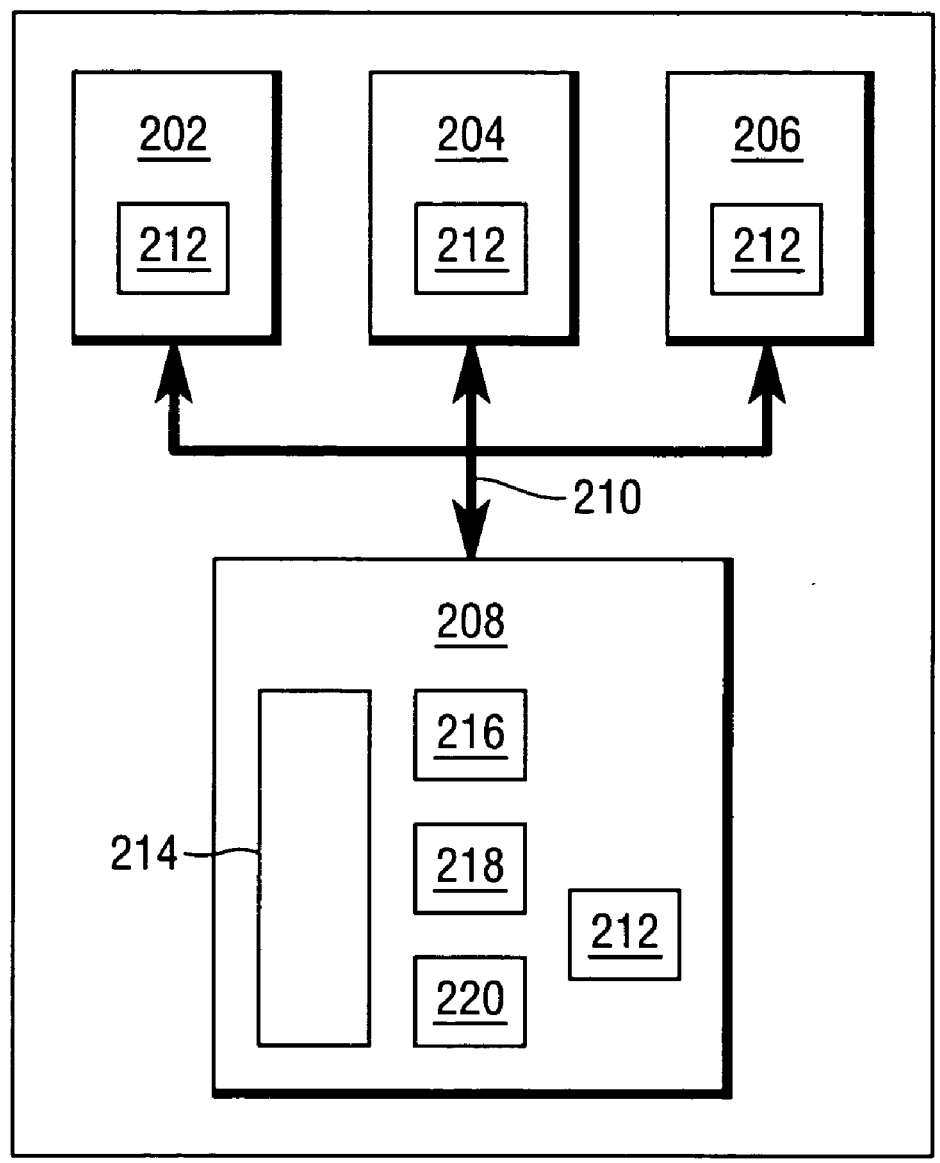
FIG. 2 schematically shows the internal components of a Self-service terminal according to one embodiment of the present invention.

The Self Service Terminal shown in FIGS. 1 and 2 is an Automated Teller Machine (ATM) 100. The ATM 100 comprises a screen 102, a card slot 104, data entry devices in the form of a 16-button key pad 106 and menu selection buttons 108, and a dispensing slot 110.

FIG. 2 shows the components of the ATM 100. The components comprise an encrypting Personal Identification Number (PIN) pad 202, a cash dispenser unit 204 and a card reader 206. The ATM 100 further comprises a processing unit in the form of a PC core 208. Each of the components contain embedded therein an identity chip 212 comprising data providing a manufacturers identity. The encrypting PIN Pad 202, cash dispenser unit 204, card reader 206 and the chip 212 associated with each component 202, 204, 206 are capable of communicating with the PC core 208 via a system bus 210.

The PC core 208 comprises a memory 214 arranged to store data. The memory 214 is capable of storing persistent data, i.e. storing data in a non-volatile manner. The PC Core 208 further comprises a requesting means 216 which is arranged to request and receive data from the chips 212 and a comparing means 218 arranged to compare identity data received by the requesting means with identity data stored in the memory 214. The PC Core 208 further comprises a security means 220, arranged to carry out a security routine to verify the identity of a maintenance operator or engineer and to ensure that that person is authorized to install a replacement component 202, 204, 206.

In normal use of the ATM 100, a user inserts a card bearing a magnetic strip and/or an encrypted data chip, usually a bank card, into the card slot 104. The card reader 206 reads the magnetic strip or encrypted data chip to obtain details associated with the card, including encrypted Personal Identification Number (PIN) data. The screen 102 is then used to display a message asking the user to enter a PIN, which the user then enters using the key pad 106. The input made is supplied to the encrypting PIN pad 202, which encrypts the entered number. The result of this encryption is compared with the encrypted PIN data read from the card and, assuming that there is a match, the user can access services though the ATM 100 by using the menu selection buttons 108 to select services shown on the screen 102. If the user asks for cash, the cash dispenser unit 204 will pick the required notes from a series of stacks of currency providing different denominations and transfer the cash to the dispensing slot 110, where it can be collected by the user.

Figure 3:
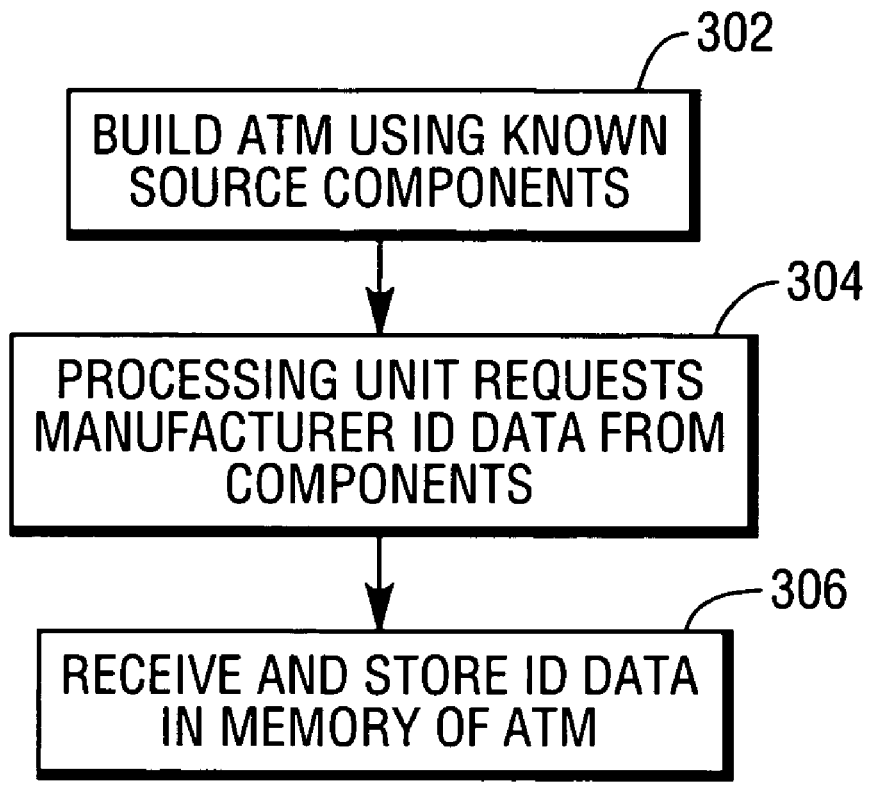
FIG. 3 shows a flowchart of the steps in 'first ever' start-up of an ATM.
Figure 4:
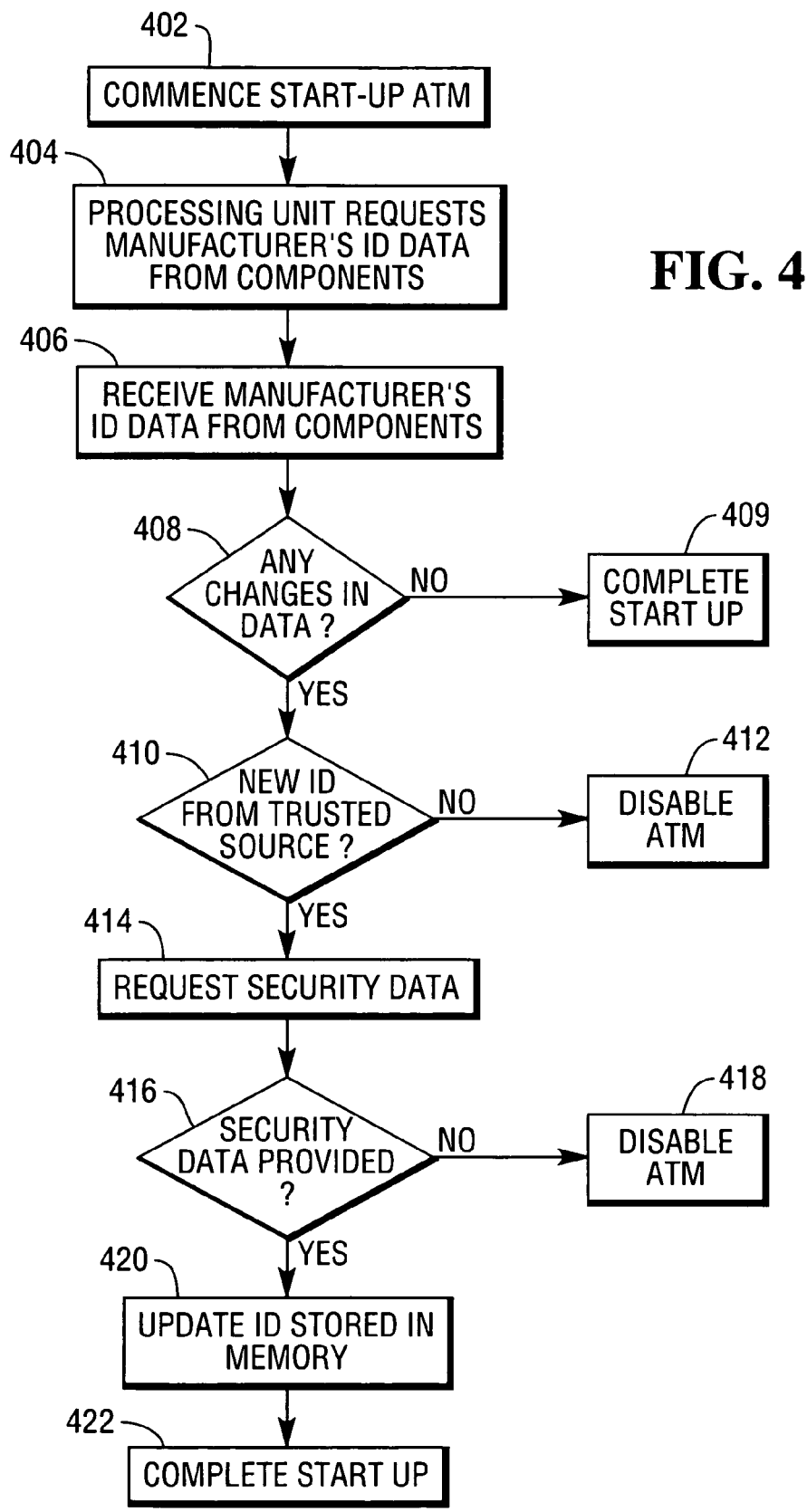
FIG. 4 shows a flowchart of the steps in subsequent start-ups of an ATM.

Two further examples of start-up of the ATM 100 are now described. The process on 'first ever' start-up of the ATM 100 is described with reference to the flow chart of FIG. 3. The validation process for components on each subsequent start-up is then described with reference to the flowchart of FIG. 4.

Prior to 'first ever' start up, the ATM 100 is built using known source components to provide the encrypting PIN pad 202, the cash dispenser unit 204, the card reader 206 and the PC core 208 (step 302). In this context, by a 'known source' it is meant that that the manufacturer of the component 202, 204, 206 may be known and has been identified as a trusted source of high-quality, reliable components 202, 204, 206. The requesting means 216 of the PC core 208 requests manufacturer identity data from the components 202, 204, 206 via the system bus 120 (step 304). Each of the components 202, 204, 206 supply the requested data, which in this example comprises a serial number in step 306. This is then stored as persistent data in the memory 214 of the PC core 208 in step 306.

In each subsequent start-up (step 402), the requesting means 216 of the PC core 208 again requests manufacturer identity data from the components 202, 204, 206 via the system bus 120 (step 404). Each of the components 202, 204, 206 supply the requested data to the requesting means 216 in step 406. The comparing means 218 of the PC core 208 checks each of the supplied identities against those stored in the memory in step 408. If there is no change in any of the identity data, then the ATM start-up completes in step 409. If however the identity of one or more of the components has changed, the comparing means 218 of the PC core 208 checks to see whether the new components come from a trusted source in step 410.

In this embodiment, the identity of a component from a known source is in the from of a serial number which conforms to a predetermined format which can be processed to verify its authenticity. However, in other embodiments, the PC core 208 may be arranged to verify the identity against identities stored in a database, which may be remote from the ATM 100.

If the new components 202, 204, 206 do not come from a trusted source then the ATM 100 is disabled in step 412. If however the new components do come from a trusted source then the PC core 208 requests that the engineer enters security data to ensure that the installation of the new component(s) has been made by an authorized individual (step 414). In this example, the security data is provided in the form USB security dongle known in this context as a Service Security Key.

In step 416, the security means 220 of the PC core 208 checks whether the Service Security Key belongs to an authorized engineer. If this is not the case then the ATM 100 is disabled in step 418. If the engineer is authorized, then the PC core updates its memory 214 with the new identification data in step 420. The start up of the ATM 100 then completes in step 422.

It will be understood that the above description of a preferred embodiment is given by way of example only and that various modifications may be made by those skilled in the art. For example, the chips 212 could be replaced with Radio Frequency IDentification (RFID) tags or other remotely accessible data stores such as those readable using Bluetooth® or Infrared technologies. As these devices can be read remotely, this removes the need for a system bus 214.

What is claimed is:

1. A method of validating machine components in an Automated Teller Machine, ATM, which includes a computer which controls operation of the ATM, comprising:
   a) providing at least one machine component with identity information in the form of a machine readable identifier;
   b) using the computer, reading identity data from the machine readable identifier by way of a bus which connects between the computer and the identifier and which carries the identity data to the computer;
   c) comparing the identity data with stored identity data to determine if the identity of a component has changed; and
   d) if the identity has changed, comparing the identity data with source data which comprises a list of acceptable identities to determine if the component is from a trusted source, and
   e) if a component is found in the ATM which is not listed on the list of acceptable identities, then disabling the ATM
in which method the stored identity data of paragraph (c) comprises a list of components within the ATM at a previous time.

2. A method according to claim 1 which is carried out on start-up of the ATM.

3. Method according to claim 1, in which the components consist of one or more item selected from the following group:
   i) an encrypting PIN pad,
   ii) a cash dispenser, and
   iii) a card reader.

4. A method of operating an Automated Teller Machine, ATM, which includes multiple components, including a computer which controls operation of the ATM comprising:
   a) storing identifying data in some, or all, of the components;
   b) upon initial, first-ever, start-up of the ATM, using a computer within the ATM to read identifying data from components by way of a bus extending between the computer and the components, and store the identifying data within memory;
   c) upon a later start-up of the ATM after servicing by a technician, using the computer within the ATM to
      i) read identifying data from components and
      ii) compare the identifying data read with that stored within the memory; and
   d) if the comparing of paragraph (c) (ii) indicates that identifying data of a component is not stored within the memory, then using the computer to contact a remote data storage location, to ascertain whether the component originates from a predetermined source.

5. Method according to claim 4, and further comprising:
   e) if, in paragraph (d) it is ascertained that the component originates from a predetermined source, requesting that the technician enter security data into the ATM which validates identity of the technician.

6. Method according to claim 4, and further comprising:
   e) shutting down the ATM if (i) the identity of a component is not found in the memory and (ii) the component does not originate from a predetermined source.

7. A method, comprising:
   a) maintaining an Automated Teller Machine, ATM, which
      i) is subject to a tampering operation in which a component is secretly replaced in the ATM to thereby allow a party to obtain security information of a user of the ATM; and
      ii) contains a computer which controls operation of the ATM, and a keypad, card reader, cash dispenser;
   b) storing identity data in the keypad and card reader;
   c) using the computer to read the identity data by way of a bus connecting between the computer and the keypad and card reader; and
   d) determining whether the identity data meets predetermined criteria and, if not, disabling the ATM, thereby preventing said party from obtaining customer data from the keypad and card reader.

* * * * *